United States Patent
Zhang et al.

(10) Patent No.: US 10,710,631 B2
(45) Date of Patent: Jul. 14, 2020

(54) MECHANISM FOR SWINGING AND STEERING SUPPORT LEG FOR PAVEMENT MILLING MACHINE

(71) Applicant: DYNAPAC (CHINA) COMPACTION & PAVING EQUIPMENT CO., LTD., Tianjin (CN)

(72) Inventors: Biao Zhang, Tianjin (CN); Jixue Chen, Tianjin (CN); Tingjian Xu, Tianjin (CN)

(73) Assignee: DYNAPAC (CHINA) COMPACTION & PAVING EQUIPMENT CO., LTD., Tianjin (CN)

( * ) Notice: Subject to any disclaimer, the term of this patent is extended or adjusted under 35 U.S.C. 154(b) by 182 days.

(21) Appl. No.: 16/084,620

(22) PCT Filed: Mar. 14, 2017

(86) PCT No.: PCT/CN2017/076579
§ 371 (c)(1),
(2) Date: Sep. 13, 2018

(87) PCT Pub. No.: WO2017/157275
PCT Pub. Date: Sep. 21, 2017

(65) Prior Publication Data
US 2019/0389511 A1 Dec. 26, 2019

(30) Foreign Application Priority Data
Mar. 16, 2016 (CN) .......................... 2016 1 0150576

(51) Int. Cl.
*B62D 11/20* (2006.01)
*B62D 55/084* (2006.01)
*E01C 23/088* (2006.01)

(52) U.S. Cl.
CPC ............ *B62D 11/20* (2013.01); *B62D 55/084* (2013.01); *E01C 23/088* (2013.01)

(58) Field of Classification Search
CPC .............................. B62D 11/20; B62D 55/084
See application file for complete search history.

(56) References Cited

U.S. PATENT DOCUMENTS 6,106,073 A * 8/2000 Simons ................. E01C 23/088
                                                        180/209
6,692,185 B2 * 2/2004 Colvard ................. B62D 7/026
                                                        180/411
(Continued)

FOREIGN PATENT DOCUMENTS

CN        201686925 U    12/2010
CN        102704385 A    10/2012
(Continued)

OTHER PUBLICATIONS

International Search Report issued in corresponding Application No. PCT/CN2017/076579 dated Jun. 12, 2017.

*Primary Examiner* — Kevin Hurley
(74) *Attorney, Agent, or Firm* — Carter, DeLuca & Farrell LLP

(57) ABSTRACT

A mechanism for swinging and steering a support leg for a pavement milling machine is provided having a milling machine frame, a swing rod, a steering rod, a first guiding rod and a second guiding rod, the support leg includes a support leg exterior sleeve and a interior sleeve, the support leg exterior sleeve is sleeved onto the support leg interior sleeve, the support leg interior sleeve rotates relative to the exterior sleeve; one end of the swing rod is hinged to the milling machine frame, and the other end is fixedly connected to the exterior sleeve; one end of the second guiding rod is hinged to the milling machine frame, the other end is hinged to one end of the first guiding rod, the other end of (Continued)

the first guiding rod is hinged to one end of the steering rod, and the other end of the steering rod is connected to the support leg interior sleeve.

5 Claims, 5 Drawing Sheets

(56) References Cited

U.S. PATENT DOCUMENTS

| | | | |
|---|---|---|---|
| 7,523,995 B2 * | 4/2009 | Rio | E01C 23/088 |
| | | | 180/209 |
| 9,068,303 B2 * | 6/2015 | Berning | E01C 23/127 |
| 9,969,427 B1 * | 5/2018 | Engels | E01C 19/187 |
| 2013/0000996 A1 * | 1/2013 | Miller | E01C 23/088 |
| | | | 180/9.46 |

FOREIGN PATENT DOCUMENTS

| | | | |
|---|---|---|---|
| CN | 105803912 A | 7/2016 | |
| CN | 205474758 U | 8/2016 | |
| IT | BO990534 A1 | 4/2001 | |
| WO | 0125545 A1 | 4/2001 | |

* cited by examiner

MECHANISM FOR SWINGING AND STEERING SUPPORT LEG FOR PAVEMENT MILLING MACHINE

CROSS REFERENCE TO RELATED APPLICATIONS

This application is a national stage application of International Application No. PCT/CN2017/076579, filed Mar. 14, 2017, which claims the benefit of and priority to Chinese Patent Application No. 201610150576.5, filed Mar. 16, 2016, the entire contents of each of which are hereby incorporated by reference herein.

TECHNICAL FIELD

The present invention relates to the field of construction machinery, and in particular, the present invention relates to a mechanism for swinging and steering a support leg for a pavement milling machine.

BACKGROUND OF THE INVENTION

The pavement milling machine is one of the main machines of pavement maintenance construction machinery, and it is a most economical modem maintenance method for milling damaged old paving layers by using the pavement milling machine, and laying new surface layers. Due to its advantages such as its high working efficiency, simple construction process, easily controllable milling depth, convenient and flexible operation, good maneuvering performance, and directly recycled and utilized milled old materials, the method is widely applied to urban municipal roads and highway maintenance projects.

When the milling machine needs to be as close as possible to an obstacle, for example, when milling a road edge, it is necessary to place the support leg on one side into the inner side of the milling machine, so that a milling drum can be as close as possible to the milling plane of the road edge, and smoothly complete the milling work of the road edge. In addition, in order to ensure stably steering of a vehicle when the support leg is placed inside, a track under the support leg also needs to be steered accordingly.

At present, the existing support leg swing is achieved by rotating around a pin roll fixed on the milling machine frame by a certain angle, however, at this time a tire or the track is also rotated by the corresponding angle following the swing of the support leg, so an additional reversing valve needs to be installed to switch oil inlet and outlet lines to change the direction of the tire or the track, which increases the cost. An alternative method for ensuring that the advancing direction of the tire or the track is unchanged before and after swinging through a four-bar mechanism, but its defect is that the tire or the track cannot be steered and an additional device is required to control the steering.

SUMMARY OF THE INVENTION

The invention aims to provide a mechanism for swinging and steering a support leg for a pavement milling machine, so as to achieve the swinging and steering of the support leg of the pavement milling machine without increasing an additional device.

In order to achieve the above aim, the mechanism for swinging and steering the support leg for the pavement milling machine in the present invention comprises a milling machine frame, a swing rod, a steering rod, a first guiding rod and a second guiding rod, wherein the support leg of the pavement milling machine comprises a support leg exterior sleeve and a support leg interior sleeve, the support leg exterior sleeve is sleeved onto the support leg interior sleeve, and the support leg interior sleeve can rotate relative to the support leg exterior sleeve; one end of the swing rod is hinged to the milling machine frame, and the other end thereof is fixedly connected to the support leg exterior sleeve; one end of the second guiding rod is hinged to the milling machine frame, the other end thereof is hinged to one end of the first guiding rod, the other end of the first guiding rod is hinged to one end of the steering rod, and the other end of the steering rod is connected to the support leg interior sleeve.

Preferably, the mechanism for swinging and steering the support leg for the pavement milling machine in the present invention further comprises a swing oil cylinder and a steering oil cylinder, wherein the swing oil cylinder can drive the swing rod to rotate relative to the milling machine frame, and the steering oil cylinder can drive the second guiding rod to rotate relative to the milling machine frame.

Preferably, the support leg interior sleeve can axially move relative to the support leg exterior sleeve.

Preferably, a sleeve ring is arranged at an end portion of the steering rod, the sleeve ring is sleeved on the support leg interior sleeve, a key groove is arranged on the support leg interior sleeve, a flat key matching with the key groove is arranged in the key groove, and the sleeve ring is fixedly connected to the flat key through a screw.

Preferably, a clamping groove is arranged on the sleeve ring, a clamping ring capable of rotating around the clamping groove is arranged on the clamping groove, and the clamping ring is fixedly connected to the support leg exterior sleeve or the swing rod through a screw.

With the mechanism for swinging and steering the support leg for the pavement milling machine of the present invention, the swinging and steering functions are achieved through a five-bar mechanism, thereby reducing the cost, and the individually controlling of the swinging and the steering can be achieved by controlling the swing oil cylinder and the steering oil cylinder, facilitating the swinging and steering control operations.

DETAILED DESCRIPTION

Figure 1:
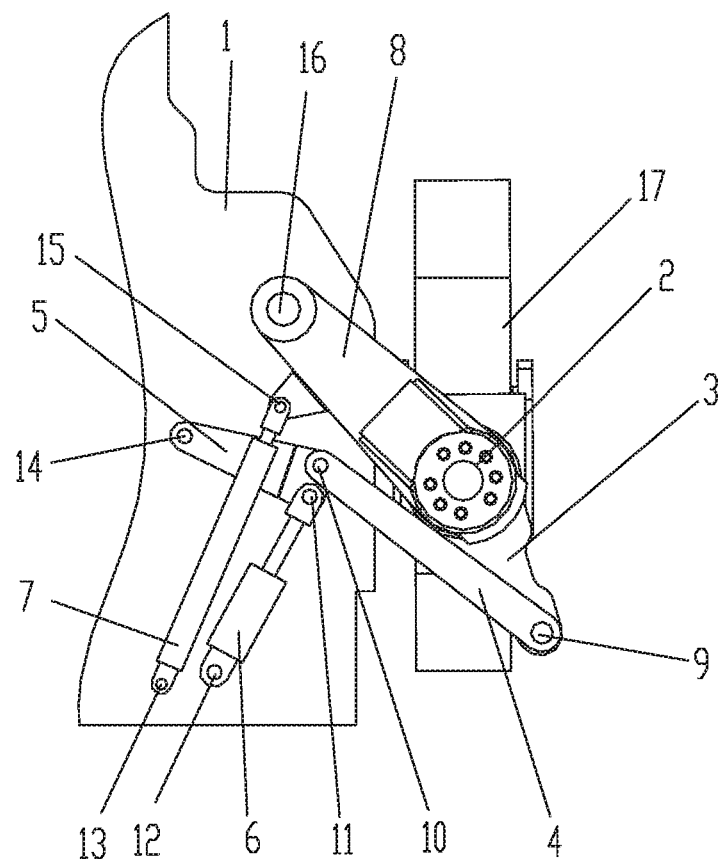
FIG. 1 is a schematic structural diagram of the mechanism for swinging and steering the support leg for the pavement milling machine in the present invention.
Figure 2:
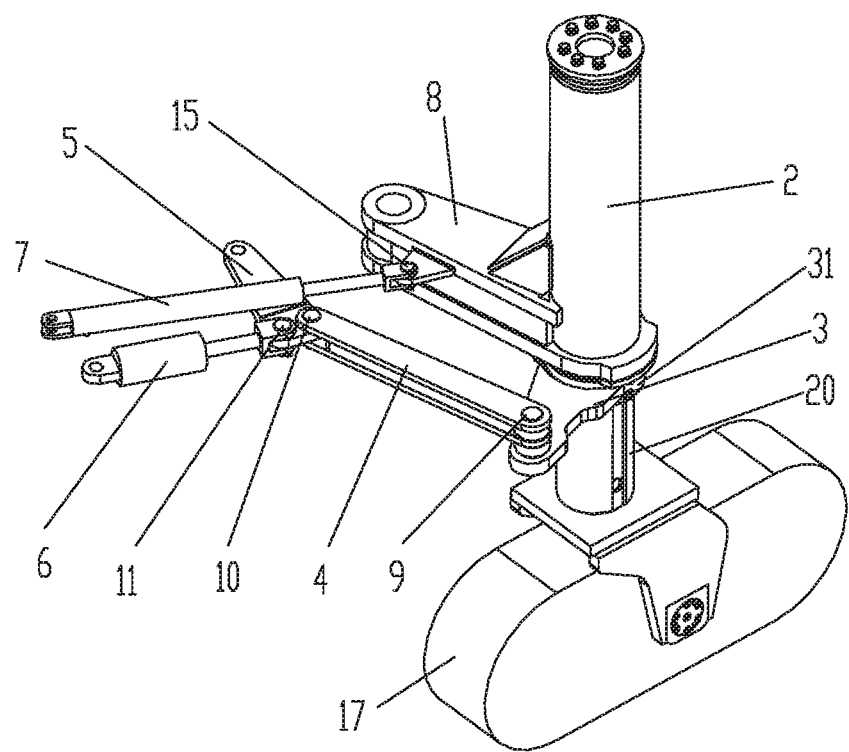
FIG. 2 is a three-dimensional schematic diagram of the mechanism for swinging and steering the support leg for the pavement milling machine in the present invention, wherein, the milling machine frame is omitted.

Embodiments of the present invention will be further described in detail with reference to the accompanying drawings, but are not to be construed as limiting the invention.

See FIG. 1 to FIG. 4, the mechanism for swinging and steering the support leg for the pavement milling machine in the present invention comprises a milling machine frame 1, a swing rod 8, a swing oil cylinder 7, a steering rod 3, a first guiding rod 4, a second guiding rod 5 and a steering oil cylinder 6.

The support leg of the pavement milling machine comprises a support leg exterior sleeve 2 and a support leg interior sleeve 20, a track 17 is installed below the support leg interior sleeve 20, the support leg exterior sleeve 2 is sleeved onto the support leg interior sleeve 20, and the support leg interior sleeve 20 can rotate relative to the support leg exterior sleeve 2, so as to achieve the steering of the track 17.

One end of the swing rod 8 is hinged to the milling machine frame 1 through a pin roll 16, and the other end thereof is fixedly connected to the support leg exterior sleeve 2, and the swing rod 8 rotates around the pin roll 16, so as to achieve the swing of the support leg exterior sleeve 2 and drive the support leg interior sleeve 20 and the track 17 therebelow to swing together. The swing of the swing rod 8 is driven through the swing oil cylinder 7. One end of the swing oil cylinder 7 is hinged to the milling machine frame 1 through a pin roll 13, the other end thereof is hinged to the middle of the swing rod 8 through a pin roll 15, and the swing rod 8 is driven to swing through stretching out and drawing back a piston rod of the swing oil cylinder 7.

One end of the second guiding rod 5 is hinged to the milling machine frame 1 through a pin roll 14, the other end thereof is hinged to one end of the first guiding rod 4 through a pin roll 10, the other end of the first guiding rod 4 is hinged to one end of the steering rod 3 through a pin roll 9, and the other end of the steering rod 3 is connected to the support leg interior sleeve 20. When the second guiding rod 5 rotates around the pin roll 14, driving the first guiding rod 4 to move, the first guiding rod 4 further drives the steering rod 3 to rotate relative to the support leg exterior sleeve 2, and since the steering rod 3 is connected to the support leg interior sleeve 20, the steering rod 3 can drive the support leg interior sleeve 20 to rotate relative to the support leg exterior sleeve 2, so as to achieve the steering of the track 17. The second guiding rod 5 is driven by the steering oil cylinder 6 to rotate, one end of the steering oil cylinder 6 is hinged to the milling machine frame 1 through a pin roll 12, the other end thereof is hinged with the second guiding rod 5 through a pin roll 11, to make the second guiding rod 5 rotate through stretching out and drawing back a piston rod of the steering oil cylinder 6. The hinged position of the steering oil cylinder 6 and the second guiding rod 5 can be arranged in the middle of the second guiding rod 5, and can also be arranged at an end portion of the second guiding rod 5.

Figure 3:
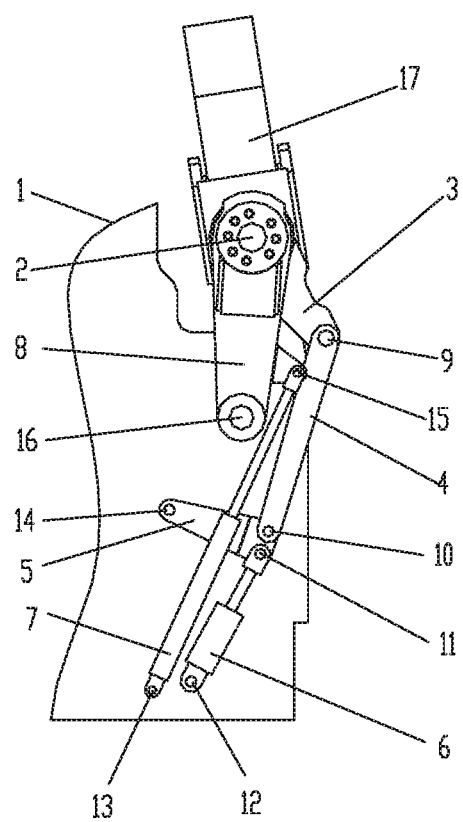
FIG. 3 is a schematic diagram of the support leg placing inside state of the mechanism for swinging and steering the support leg for the pavement milling machine as shown in FIG. 1.
Figure 4:
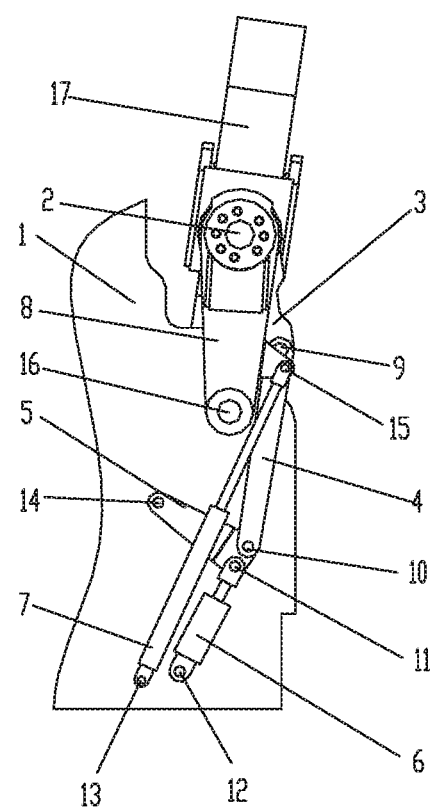
FIG. 4 is a schematic diagram of clockwise steering of the track under the support leg placing inside state of the mechanism for swinging and steering the support leg for the pavement milling machine as shown in FIG. 3.

Before the mechanism for swinging and steering the support leg for the pavement milling machine in the present invention swings and steers, the track 17 is arranged on the outer side of the milling machine frame 1 in the state as shown in FIG. 1; when the support leg needs to be placed inside, the swing oil cylinder 7 drives the swing rod 8 to swing inwardly around the pin roll 16, the steering oil cylinder 6 keeps unchanged, and at the moment, the swing rod 8 rotates around the pin roll 16, so as to place the support leg exterior sleeve 2 and the support leg interior sleeve 20 as well as the track 17 into the inner side of the milling machine frame 1 in the state as shown in FIG. 3, and at the moment, the direction of the track 17 is preferably designed to be turned to the left by a maximum angle, so that the track 17 can directly turn left after being placed inside; finally, the steering is performed, and at the moment, the swing oil cylinder 7 keeps unchanged, and the steering oil cylinder 6 drives the second guiding rod 5 to rotate around the pin roll 14, so as to adjust the direction of the track 17 in the state as shown in FIG. 4.

Hence, the milling machine frame 1, the swing rod 8, the steering rod 3, the first guiding rod 4 and the second guiding rod 5 form a five-bar mechanism, thereby achieving the functions of swinging the support leg and steering the track.

Figure 5:
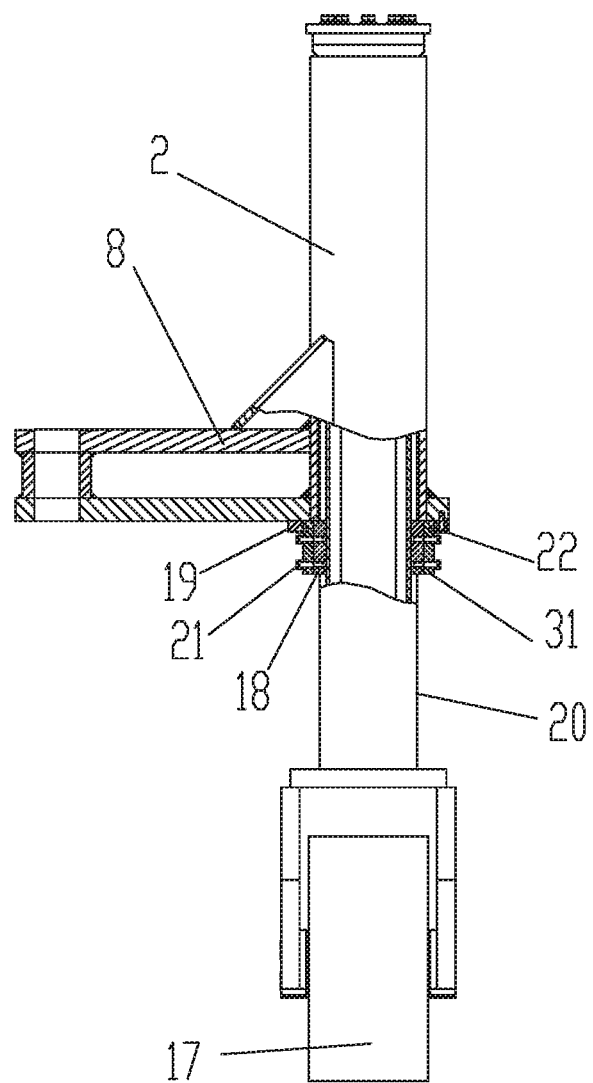
FIG. 5 is a schematic diagram showing the connection relation between the support leg exterior sleeve and the support leg interior sleeve.

The support leg exterior sleeve 2 can rotate relative to the support leg interior sleeve 20, and the support leg interior sleeve 20 is also axially movable relative to the support leg exterior sleeve 2, so as to make its height adjustable. See FIG. 5, in combination with FIG. 2, a sleeve ring 31 is arranged at an end portion of the steering rod 3, the sleeve ring 31 is sleeved on the support leg interior sleeve 20, a key groove is arranged on the support leg interior sleeve 20, a flat key 18 matched with the key groove is arranged in the key groove, and the sleeve ring 31 is fixedly connected to the flat key 18 through a screw 21, by doing so, when the steering rod 3 rotates, it can drive the support leg interior sleeve 20 to rotate; and a clamping groove is arranged on the sleeve ring 31, a clamping ring 19 capable of rotating around the clamping groove is arranged on the clamping groove, and the clamping ring 19 is fixedly connected to the support leg exterior sleeve 2 or the swing rod 8 through a screw 22. Therefore, the support leg interior sleeve 20 can rotate and axially move in the support leg exterior sleeve 2.

The above examples are only exemplary embodiments of the present invention and are not intended to limit the scope of the invention, which is defined by the claims. Those skilled in the art may make various modifications and equivalent replacements to the invention within the essence and protection scope thereof, and such modifications and replacements should also be regarded as falling in the protection scope of the invention.

The invention claimed is:

1. A mechanism for swinging and steering a support leg for a pavement milling machine, comprising:
   a milling machine frame;
   a swing rod;
   a steering rod; and
   a first guiding rod and a second guiding rod,
   wherein the support leg of the pavement milling machine comprises a support leg exterior sleeve and a support leg interior sleeve, the support leg exterior sleeve is sleeved onto the support leg interior sleeve, and the support leg interior sleeve configured to rotate relative to the support leg exterior sleeve,
   wherein one end of the swing rod is hinged to the milling machine frame, and the other end thereof is fixedly connected to the support leg exterior sleeve,
   wherein one end of the second guiding rod is hinged to the milling machine frame, the other end thereof is hinged to one end of the first guiding rod, the other end of the first guiding rod is hinged to one end of the steering rod, and the other end of the steering rod is connected to the support leg interior sleeve.

2. The mechanism for swinging and steering the support leg for the pavement milling machine of claim 1, further comprising a swing oil cylinder and a steering oil cylinder, wherein the swing oil cylinder can drive the swing rod to rotate relative to the milling machine frame, and the steering oil cylinder can drive the second guiding rod to rotate relative to the milling machine frame.

3. The mechanism for swinging and steering the support leg for the pavement milling machine of claim 1, wherein, the support leg interior sleeve is configured to axially move relative to the support leg exterior sleeve.

4. The mechanism for swinging and steering the support leg for the pavement milling machine of claim 1, further comprising:
- a sleeve ring arranged at an end portion of the steering rod, the sleeve ring being sleeved on the support leg interior sleeve;
- a key groove arranged on the support leg interior sleeve; and
- a flat key matching with the key groove arranged in the key groove, wherein the sleeve ring is fixedly connected to the flat key through a screw.

5. The mechanism for swinging and steering the support leg for the pavement milling machine of claim 4, further comprising:
- a clamping groove arranged on the sleeve ring; and
- a clamping ring capable of rotating around the clamping groove and arranged on the clamping groove, wherein the clamping ring is fixedly connected to the support leg exterior sleeve or the swing rod through a screw.

\* \* \* \* \*